United States Patent
Feng et al.

(10) Patent No.: US 8,526,277 B2
(45) Date of Patent: Sep. 3, 2013

(54) METHOD FOR DETERMINING TYPE OF OPTICAL DISK AND OPTICAL STORAGE DEVICE

(75) Inventors: Wen-Chun Feng, Taipei (TW); Chien-Liang Yeh, Kaohsiung (TW)

(73) Assignee: Sunplus Technology Co., Ltd., Hsinchu (TW)

(*) Notice: Subject to any disclaimer, the term of this patent is extended or adjusted under 35 U.S.C. 154(b) by 306 days.

(21) Appl. No.: 13/040,269

(22) Filed: Mar. 4, 2011

(65) Prior Publication Data

US 2012/0075971 A1    Mar. 29, 2012

(30) Foreign Application Priority Data

Sep. 27, 2010 (TW) .............................. 99132634 A

(51) Int. Cl.
- G11B 7/00 (2006.01)
- G11B 5/58 (2006.01)
- G11B 5/55 (2006.01)

(52) U.S. Cl.
USPC .................. 369/44.23; 369/53.23; 369/53.28

(58) Field of Classification Search
USPC ................. 369/44.23, 53.23, 53.28
See application file for complete search history.

(56) References Cited

U.S. PATENT DOCUMENTS

| 2003/0053387 A1* | 3/2003 | Lee et al. .................. 369/53.18 |
| 2004/0165493 A1* | 8/2004 | Fukui ........................ 369/44.32 |
| 2009/0080305 A1* | 3/2009 | Lee ............................ 369/53.22 |
| 2009/0201785 A1* | 8/2009 | Shinoda .................... 369/112.01 |
| 2010/0157763 A1* | 6/2010 | Verbeek et al. ........... 369/53.22 |
| 2011/0096647 A1* | 4/2011 | Yamada et al. ........... 369/44.32 |

FOREIGN PATENT DOCUMENTS

CN    1941134    4/2007

OTHER PUBLICATIONS

"First Office Action of China Counterpart Application", issued on Oct. 28, 2011, p. 1-p. 5.

* cited by examiner

*Primary Examiner* — Aneeta Yodichkas
(74) *Attorney, Agent, or Firm* — Jianq Chyun IP Office

(57) ABSTRACT

A method for determining a type of an optical disk includes following steps. A laser beam of a first type is focused on a disk to generate a first optical reflection signal. A first spherical aberration estimate is generated according to the degree of dispersion and strength of the first optical reflection signal. A laser beam of a second type is focused on the disk to generate a second optical reflection signal. A second spherical aberration estimate is generated according to the degree of dispersion and strength of the second optical reflection signal. The type of the disk is determined based on the first spherical aberration estimate and the second spherical aberration estimate.

18 Claims, 11 Drawing Sheets

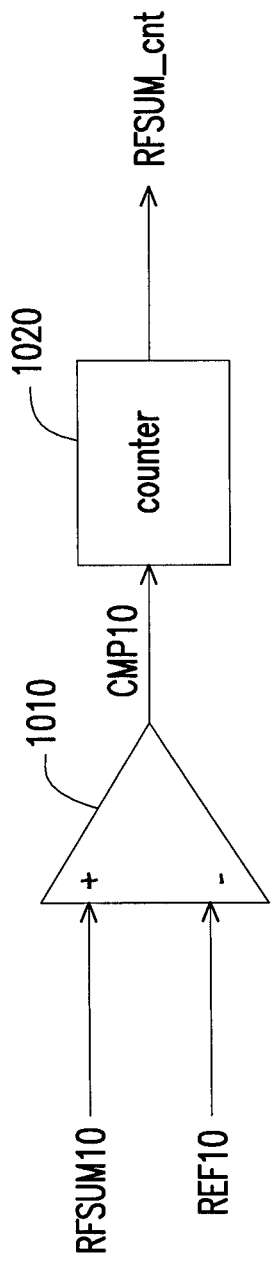
FIG. 10
FIG. 11A
FIG. 11B

METHOD FOR DETERMINING TYPE OF OPTICAL DISK AND OPTICAL STORAGE DEVICE

CROSS-REFERENCE TO RELATED APPLICATION

This application claims the priority benefit of Taiwan application serial no. 99132634, filed Sep. 27, 2010. The entirety of the above-mentioned patent application is hereby incorporated by reference herein and made a part of this specification.

BACKGROUND OF THE INVENTION

1. Field of the Invention

The invention relates to a method for determining a type of an optical disk and an optical storage device. More particularly, the invention relates to a method for determining a type of an optical disk based on a spherical aberration estimate and an optical storage device.

2. Description of Related Art

Optical storage devices available in the market are mainly categorized into two types, i.e., digital versatile disks (DVD) and compact disks (CD). The two types of disks are extensively applied, and accordingly manufacturers endeavor to research and manufacture optical storage devices capable of reading both types of disks. The optical storage devices capable of reading both types of disks are inevitably required to be able to determine the types of the disks.

At present, the types of disks can be determined based on a disk reflection rate because the disks are sensitive to specific light wavelength. Alternatively, the types of disks can be determined based on thickness of disk substrate. Specifically, the types of disks can be determined based on the disk reflection rate because dye on the data layer of CD has a relatively high reflection rate when reflecting the laser beam having a wavelength of 780 nm, while dye on the data layer of DVD has a relatively high reflection rate when reflecting the laser beam having a wavelength of 650 nm. However, the reflection rate is prone to be affected by different disks, thus causing erroneous determination of the types of disks. For instance, in case that the disk is scratched or the disk reflection rate is low, the system is unable to correctly compare the measured error signals (e.g., focus error signals), and thereby the types of disks are mistakenly determined.

The types of disks can also be determined based on the thickness of the disk substrate. This is mainly because the thickness of the CD substrate is 1.2 mm, while the thickness of the DVD substrate is 0.6 mm. By focusing the laser beam on a transparent layer of the disk to generate reflection signals, the types of disks can be determined based on the thickness of the disks when a slope of a focus driving signal remains constant. Nevertheless, if the reflection rate at the surface of the disk is overly small, the location of the surface of the disk may be mistakenly detected or cannot be detected. In addition, the slope of the focus control signal is often changed together with variations in manufacturing conditions of actuators or motor drivers. Hence, errors often occur when the time difference from the surface of the disk to the reflection layer is measured, such that the system cannot accurately determine the thickness of the disk.

SUMMARY OF THE INVENTION

The invention is directed to a method for determining a type of an optical disk based on a spherical aberration estimate, so as to accurately determine the type of the disk.

The invention is further directed to an optical storage device capable of rectifying inconsistency of a motor driver or an actuator and further improving accuracy of disk determination.

The invention provides a method for determining a type of an optical disk. The method includes following steps. A laser beam of a first type is focused on a disk to generate a first optical reflection signal. A first spherical aberration estimate is generated according to the degree of dispersion and strength of the first optical reflection signal. A laser beam of a second type is focused on the disk to generate a second optical reflection signal. A second spherical aberration estimate is generated according to the degree of dispersion and strength of the second optical reflection signal. The type of the disk is determined based on the first spherical aberration estimate and the second spherical aberration estimate.

According to an embodiment of the invention, the step of determining the type of the disk based on the first spherical aberration estimate and the second spherical aberration estimate includes determining whether the first spherical aberration estimate is less than the second spherical aberration estimate. The type of the disk is determined to be the first type when the first spherical aberration estimate is less than the second spherical aberration estimate. By contrast, the type of the disk is determined to be the second type when the first spherical aberration estimate is greater than the second spherical aberration estimate.

According to an embodiment of the invention, the step of determining the type of the disk based on the first spherical aberration estimate and the second spherical aberration estimate includes dividing the second spherical aberration estimate by the first spherical aberration estimate to obtain a spherical aberration ratio. In addition, whether the spherical aberration ratio is greater than a threshold value is determined. The type of the disk or a read layer of the disk is determined to be the first type when the spherical aberration ratio is greater than the threshold value. By contrast, the type of the disk or the read layer of the disk is determined to be the second type when the spherical aberration ratio is smaller than the threshold value.

According to an embodiment of the invention, the method of determining the type of the disk further includes counting the number of the peak value of the first optical reflection signal and accordingly generating a counted value. Whether the counted value equals 1 is determined. The type of the disk is determined to be a third type when the counted value equals 1.

According to an embodiment of the invention, the degree of dispersion of the first optical reflection signal is divided by the strength of the first optical reflection signal to obtain the first spherical aberration estimate; the degree of dispersion of the second optical reflection signal is divided by the strength of the second optical reflection signal to obtain the second spherical aberration estimate.

From another perspective, the invention provides an optical storage device including an optical pickup head and a control module. The optical pickup head respectively focuses a laser beam of a first type and a laser beam of a second type on a disk to generate a first optical reflection signal and a second optical reflection signal. The control module generates a first spherical aberration estimate based on the degree of dispersion and strength of the first optical reflection signal and generates a second spherical aberration estimate based on the degree of dispersion and strength of the second optical reflection signal. The control module then determines the type of the disk based on the first spherical aberration estimate and the second spherical aberration estimate.

According to an embodiment of the invention, the control module includes a detecting unit, a calculating unit, and a memory. The detecting unit respectively detects the degree of dispersion and the strength of the first and second optical reflection signals. The calculating unit calculates the first spherical aberration estimate based on the degree of dispersion and the strength of the first optical reflection signal and calculates the second spherical aberration estimate based on the degree of dispersion and the strength of the second optical reflection signal. The memory records the first and second spherical aberration estimates. The control module further controls a motor driver, such that the motor driver drives a focus actuator and thereby moves an object lens up and down.

According to an embodiment of the invention, the control module determines whether the first spherical aberration estimate is less than the second spherical aberration estimate. The control module further determines the type of the disk to be the first type when the first spherical aberration estimate is less than the second spherical aberration estimate, and the control module determines the type of the disk to be the second type when the first spherical aberration estimate is greater than the second spherical aberration estimate.

According to an embodiment of the invention, the control module divides the second spherical aberration estimate by the first spherical aberration estimate to obtain a spherical aberration ratio and determines whether the spherical aberration ratio is greater than a threshold value, so as to determine the type of the disk to be the first type when the spherical aberration ratio is greater than the threshold value and determine the type of the disk or a read layer of the disk to be the second type when the spherical aberration ratio is smaller than the threshold value.

Based on the above, the type of the disk is determined based on the spherical aberration estimates when different laser sources are given in this invention. It is not necessary to determine the type of the disk by measuring signals at the surface of the disk, and thus errors caused by measuring the signals at the surface of the disk do not occur in this invention. In addition, issues regarding inconsistency of the motor driver or the actuator can be prevented in the invention when the spherical aberration estimates are generated. In comparison with the related art, the invention improves accuracy of disk determination.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a schematic block diagram illustrating a peak counter according to an embodiment of the invention.

FIG. 11A and FIG. 11B illustrate time sequence signals of the peak counter.

DESCRIPTION OF EMBODIMENTS

In the invention, a type of a disk is determined based on spherical aberration of focuses in a data layer when different laser beams are given. Hence, formation of spherical aberration is elaborated prior to discussion on embodiments of the invention.

Figure 1:
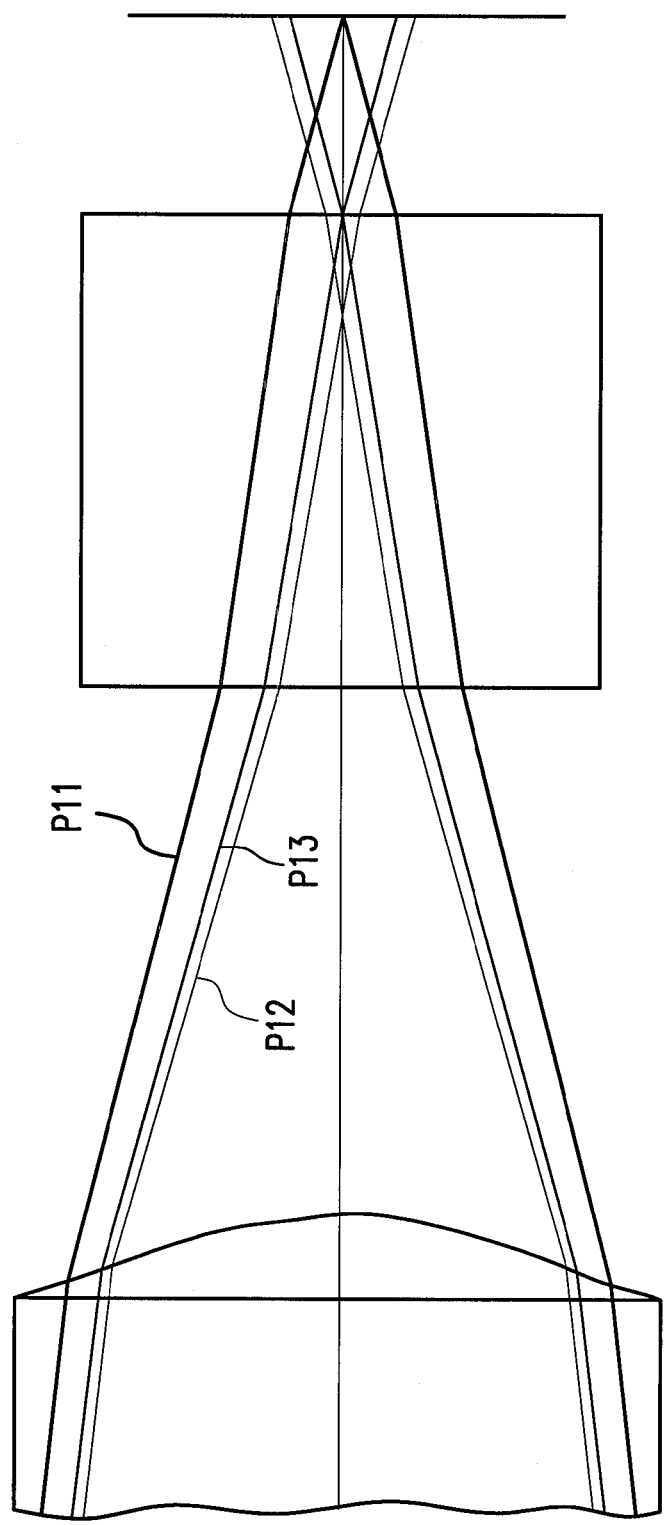
FIG. 1 is a schematic view illustrating that laser beams are focused on a disk through an object lens.

The spherical aberration is optical aberration generated when a paraxial focus and an abaxial focus on an object lens are different. For instance, as shown in FIG. 1, which is a schematic view illustrating that laser beams are focused on a disk through an object lens, a light path P11 and a light path P12 respectively form an abaxial focus and a paraxial focus, while a light path P13 forms a focus. When the three focuses are not simultaneously formed on the data layer, the spherical aberration is generated, which negatively affects data reading and writing quality because energy of optical spots on the data layer is not evenly distributed. Moreover, optical reflection signals are dispersed, and strength of the signals is weakened.

To improve the data reading and writing quality of the optical pickup head and generate appropriate optical reflection signals, the design of an optical storage device aims at removing the spherical aberration of the focuses. Hence, no matter what type of disk is read by the optical storage device, the paraxial light and the abaxial light should be simultaneously focused on the data layer. The DVD and the CD are taken for example. When the substrate of the DVD having the thickness of 0.6 mm is read, the paraxial light and the abaxial light are simultaneously focused on the data layer of the DVD. Likewise, when the substrate of the CD having the thickness of 1.2 mm is read, the paraxial light and the abaxial light are simultaneously focused on the data layer of the CD.

Since the substrates of the two different disks have different thicknesses, the light paths are changed together with different laser beams. Hence, when the CD is read by applying the DVD laser beam, the paraxial focus and the abaxial focus are different because the thickness of the substrate is changed. Likewise, when the DVD is read by applying the CD laser beam, the spherical aberration is generated because the length of the paraxial light path and the length of the abaxial light path in the substrate are changed along with the changed thickness of the substrate.

When the spherical aberration is generated, locations of the paraxial focus and the abaxial focus are altered. Accordingly, when the object lens moves upward or downwards, a plurality of focuses sequentially pass through a data recording surface of the disk. Thereby, the light beam reflected by the data recording surface leads to dispersion of optical reflection signals on a time axis. Meanwhile, due to the focus dispersion, light reflected by each focus has reduced strength, which further weakens the strength of the optical reflection signals.

Figure 2:
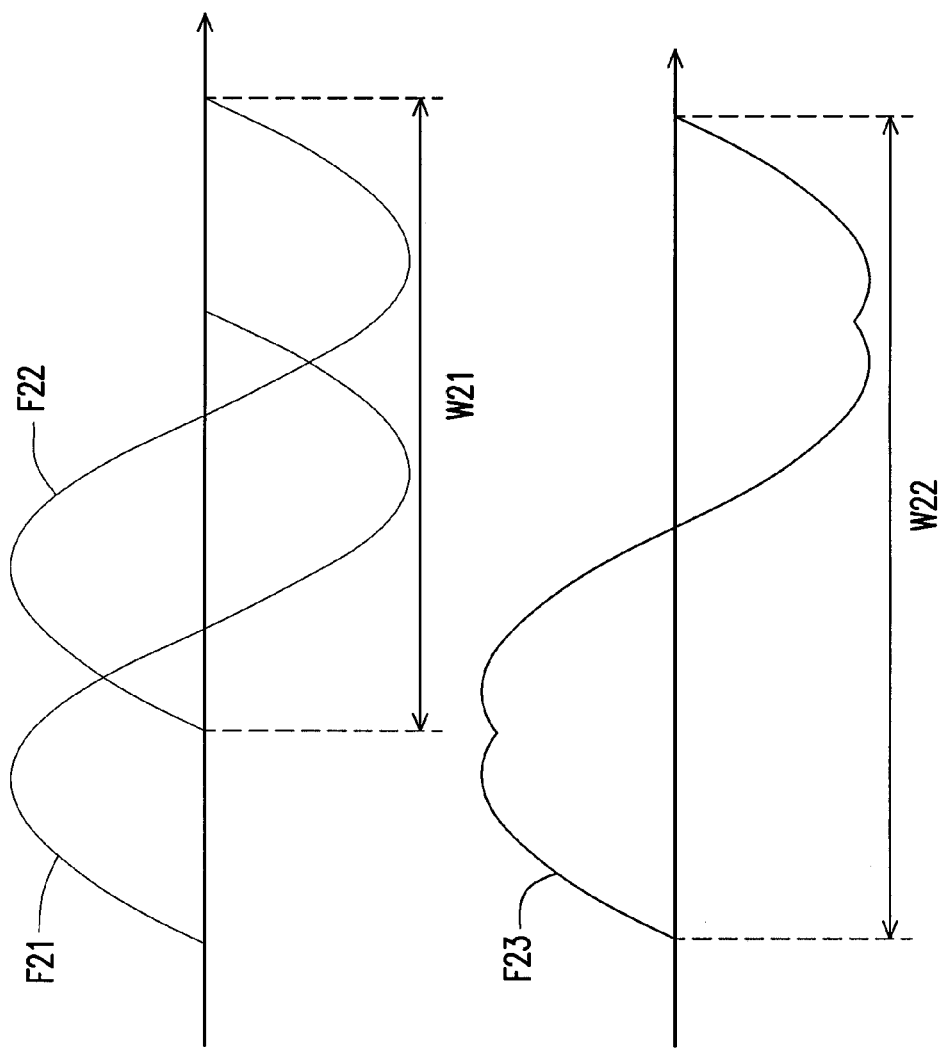
FIG. 2 is a schematic view illustrating focus error signals caused by focus dispersion.

FIG. 2 is a schematic view illustrating focus error signals caused by focus dispersion. As shown in FIG. 2, in an optical system, the abaxial light generates an abaxial focus error signal F21, and a paraxial focus error signal F22 is then generated. When the two signals F21 and F22 are combined, the final focus error signal F23 detected by the optical system generates jitters and has an increased width. For instance, a width W22 of the focus error signal F23 is greater than a width W21 of the focus error signal F21 and that of the focus error signal F22, respectively. Meanwhile, the different paraxial focus and abaxial focus lead to dispersion of optical energy, and the strength of the focus error signal F23 is then reduced.

To assess the degree of spherical aberration, a spherical aberration estimate (also referred to as "SAE" hereinafter) is defined in the embodiments of the invention, as indicated in equation (1):

$$SAE = \frac{\text{dispersion degree of optical reflection signal}}{\text{strength of optical reflection signal}} \quad (1)$$

The greater the SAE, the greater the spherical aberration. Therefore, when the disk is read by applying different laser sources, the SAE corresponding to different optical reflection signals can be compared to find out the laser source used to generate the least spherical aberration of the disk. Thereby, the type of the disk can be determined After the spherical aberration caused by different laser beams on different disks is discussed, various embodiments of the invention are described hereinafter based on the above discussion.

Figure 3:
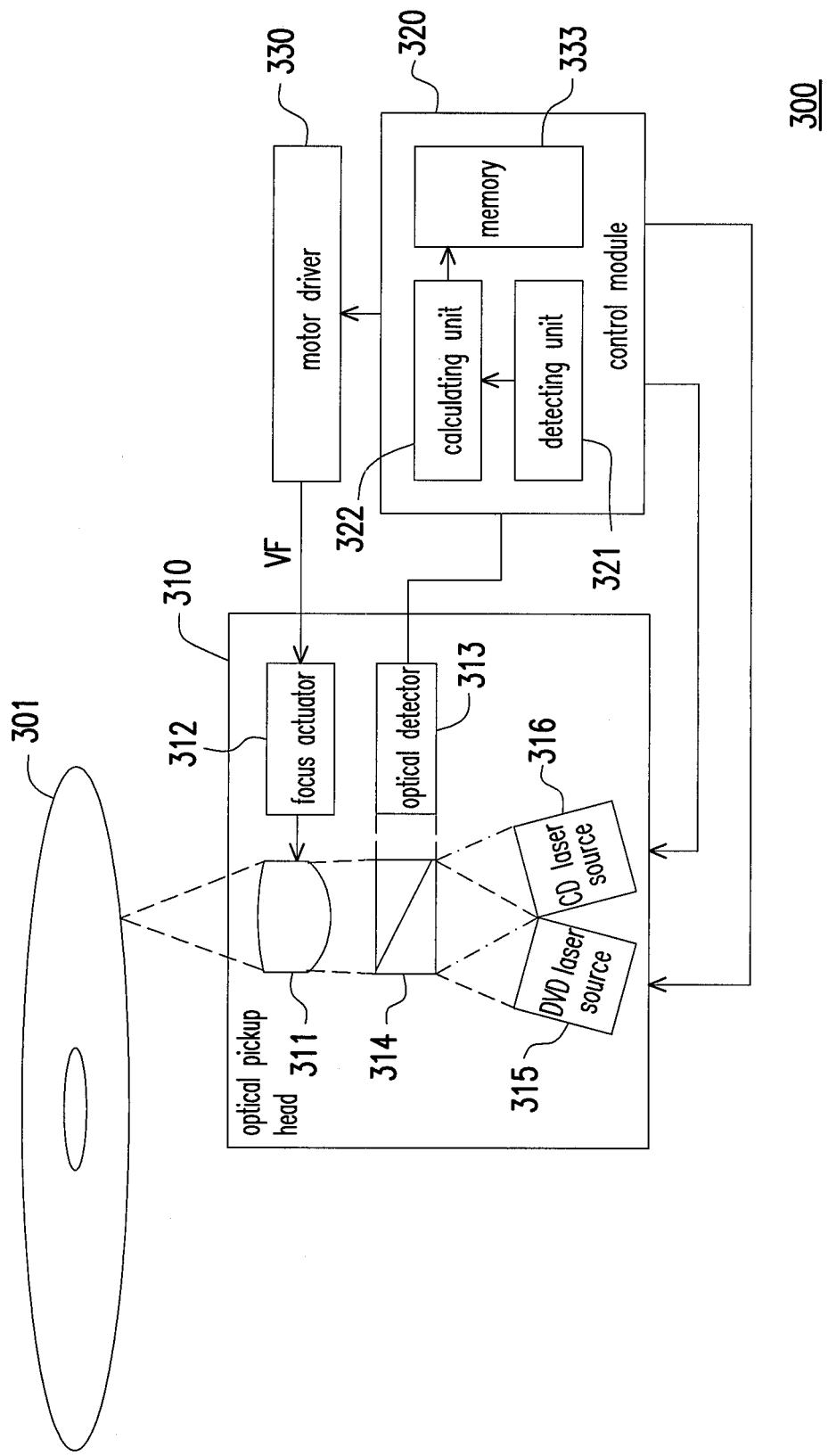
FIG. 3 is a schematic block diagram illustrating an optical storage device according to an embodiment of the invention.

FIG. 3 is a schematic block diagram illustrating an optical storage device according to an embodiment of the invention. As indicated in FIG. 3, an optical storage device 300 includes an optical pickup head 310, a control module 320, and a motor driver 330. The optical pickup head 310 includes an object lens 311, a focus actuator 312, an optical detector 313, a polarizer 314, a DVD laser source 315, and a CD laser source 316. The control module 320 includes a detecting unit 321, a calculating unit 322, and a memory 333.

Based on the control signal transmitted by the control module 320, the DVD laser source 315 of the optical pickup head 310 determines whether to provide the DVD laser beam, i.e., the laser beam of a first type. Moreover, based on the control signal transmitted by the control module 320, the CD laser source 316 of the optical pickup head 310 also determines whether to provide the CD laser beam, i.e., the laser beam of a second type. The polarizer 314 guides the DVD laser beam or the CD laser beam to the object lens 311. In addition, the polarizer 314 guides the DVD laser beam or the CD laser beam reflected by the disk 301 to the optical detector 313.

Based on the laser beams detected by the optical detector 313, the optical detector 313 correspondingly generates electrical signals A, B, C, D, E, and F, and different optical reflection signals can be generated by calculating the electrical signals A, B, C, D, E, and F. The optical reflection signal, for example, is a tracking error signal TE, a focus error signal FE, a radio frequency signal RF, or a summed-up sub-beam signal RFSUM, wherein TE=(E−F), FE=(A+C)−(B+D), and RF=(A+C+B+D). As such, the control module 320 can control the motor driver 330 based on the optical reflection signals generated by the optical detector 313, and the motor driver 330 can further adjust the level of a focus driving voltage VF. Besides, the focus actuator 312 moves the object lens 311 in a vertical, upward manner or in a vertical, downward manner according to the focus driving voltage VF. Consequently, the DVD laser beam or the CD laser beam can be focused on the disk 301 by the object lens 311.

Figure 4:
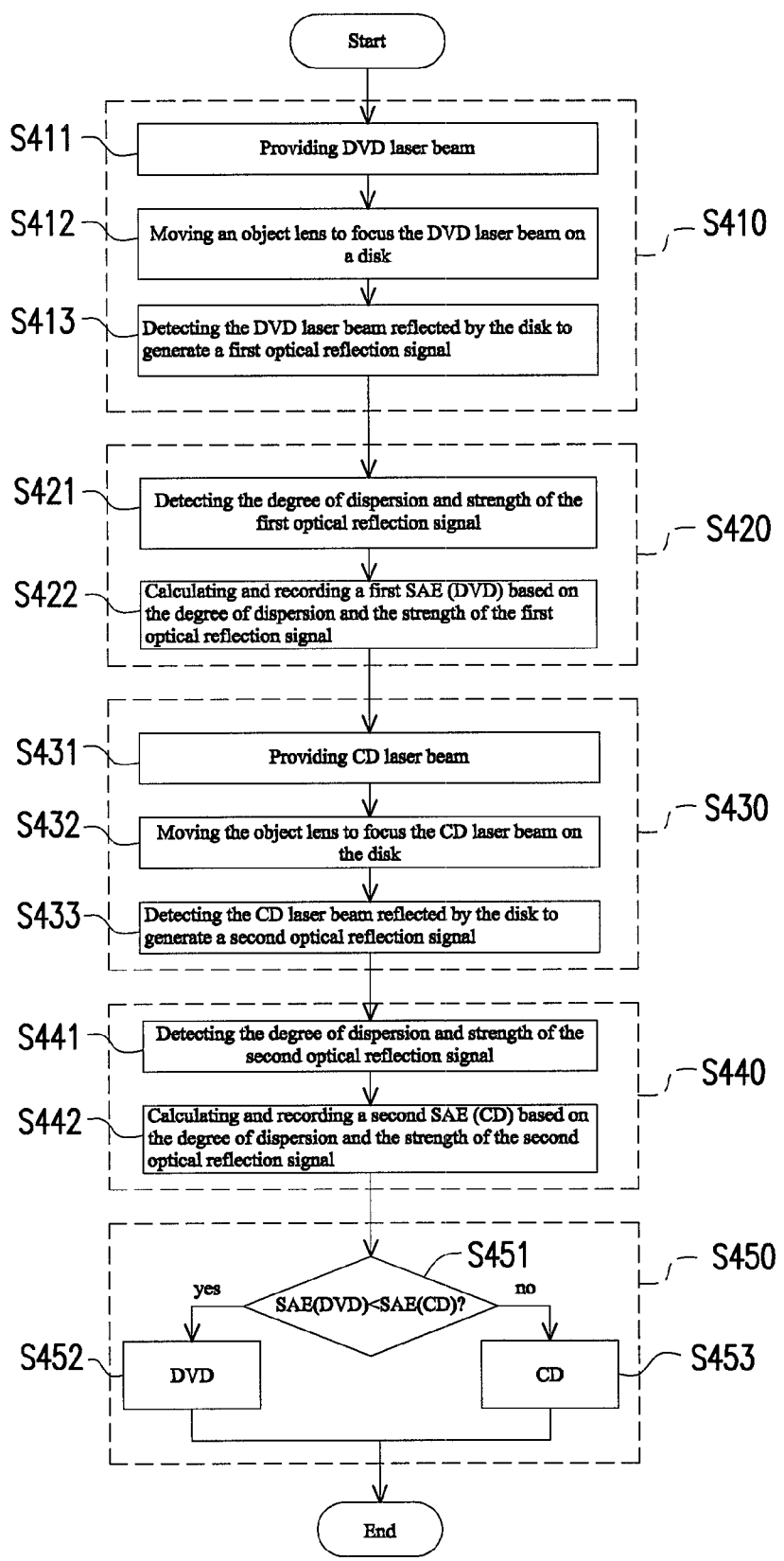
FIG. 4 is a schematic block flowchart illustrating a method for determining a type of a disk according to an embodiment of the invention.

Since the optical pickup head 310 supplies two types of laser beams, the optical storage device 300 can read the disk 301 of the first type (the DVD) or the second type (the CD). Before reading the disk 301, the optical storage device 300 determines the type of the disk 301, so as to supply an appropriate light source. FIG. 4 is a schematic block flowchart illustrating a method for determining a type of a disk according to an embodiment of the invention. In FIG. 3 and FIG. 4, how the control module 320 obtains the SAEs when different laser sources are applied and thereby determines the type of the disk 301 is illustrated.

To obtain the SAE when the DVD laser source is applied (step S410), the optical storage device 300 focuses the DVD laser beam on the disk 301 to generate a first optical reflection signal. Next, in step S420, the optical storage device 300 generates a first SAE based on the degree of dispersion and strength of the first optical reflection signal.

In the process of generating the first optical reflection signal, as indicated in step S411~step S413, the control module 320 turns on the DVD laser source 315 for supplying the DVD laser beam. The control module 320 then controls the focus actuator 312 through the motor driver 330, so as to relatively move the object lens 311 and focus the DVD laser beam on the disk 301. On the other hand, the optical detector 313 detects the DVD laser beam reflected by the disk 301 and thereby generates the first optical reflection signal.

In the process of generating the first SAE, as indicated in step S421~step S422, the detecting unit 321 first determines the degree of dispersion and the strength of the first optical reflection signal. The calculating unit 322, based on the degree of dispersion and the strength of the first optical reflection signal, calculates the first SAE (DVD) and records the first SAE (DVD) into the memory 333. The degree of dispersion of the first optical reflection signal is divided by the strength of the first optical reflection signal to obtain the first SAE (DVD).

On the other hand, to obtain the SAE when the CD laser source is applied (step S430), the optical storage device 300 focuses the CD laser beam on the disk 301 to generate a second optical reflection signal. Next, in step S440, the optical storage device 300 generates a second SAE based on the degree of dispersion and strength of the second optical reflection signal.

In the process of generating the second optical reflection signal, as indicated in step S431~step S433, the control module 320 turns on the CD laser source 316 for supplying the CD laser beam. The control module 320 then controls the focus actuator 312 through the motor driver 330, so as to relatively move the object lens 311 and focus the CD laser beam on the disk 301. On the other hand, the optical detector 313 detects the CD laser beam reflected by the disk 301 and thereby generates the second optical reflection signal.

In the process of generating the second SAE, as indicated in step S441~step S442, the detecting unit 321 first determines the degree of dispersion and the strength of the second optical reflection signal. The calculating unit 322, based on the degree of dispersion and the strength of the second optical reflection signal, calculates the second SAE (CD) and records the second SAE (CD) into the memory 333. The degree of dispersion of the second optical reflection signal is divided by the strength of the second optical reflection signal to obtain the second SAE (DVD).

In step S450, the control module 320 determines the type of the disk 301 based on the first SAE (DVD) and the second SAE (CD). Here, as indicated in step S451~step S453, the control module 320 determines whether the first SAE (DVD) is less than the second SAE (CD). The disk 301 has less spherical aberration when the DVD laser beam is applied, given that the first SAE (DVD) is less than the second SAE (CD). At this time, the control module 320 determines the disk 301 read by the optical pickup head 310 to be the DVD. By contrast, the disk 301 has less spherical aberration when the CD laser beam is applied, given that the first SAE (DVD) is greater than the second SAE (CD). At this time, the control module 320 determines the disk 301 read by the optical pickup head 310 to be the CD.

In this embodiment, it should be mentioned that the degree of dispersion of the first optical reflection signal is proportional to a width of the first optical reflection signal, and the strength of the first optical reflection signal is proportional to a peak value of the first optical reflection signal. Similarly, the degree of dispersion of the second optical reflection signal is proportional to a width of the second optical reflection signal, and the strength of the second optical reflection signal is proportional to a peak value of the second optical reflection signal.

Figure 5:
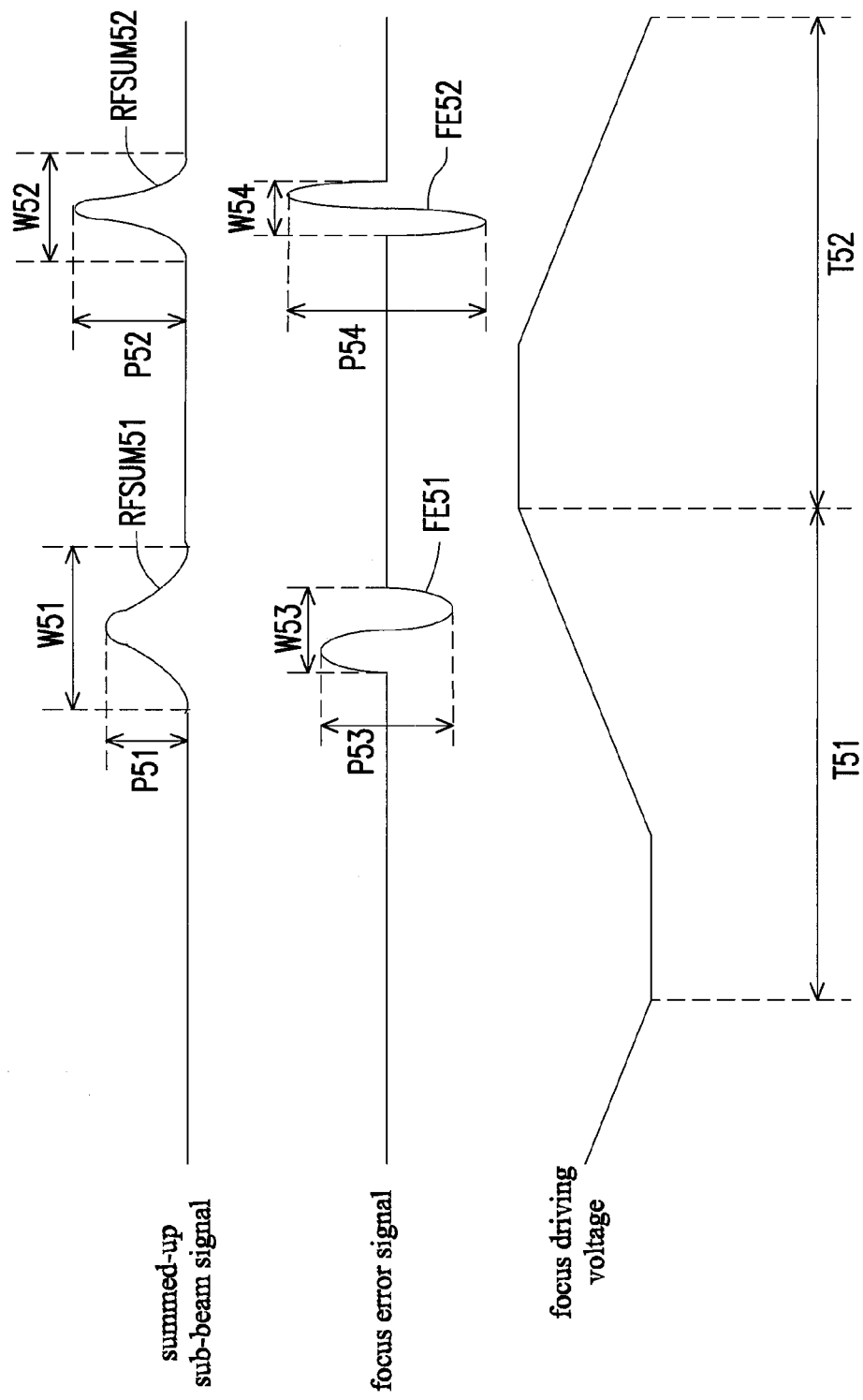
FIG. 5 is a time sequence diagram illustrating optical reflection signals and focus driving voltages generated by a system when a to-be-tested disk is a single-layer disk.

FIG. 5 is a time sequence diagram illustrating optical reflection signals and focus driving voltages generated by a system when a to-be-tested disk is a single-layer disk, for example. As indicated in FIG. 5, in a period T51, the DVD laser source constantly supplies the DVD laser beam, and the object lens 311 moves upwards together with the increasing level of the focus driving voltage. Thereby, the DVD laser beam is focused on the disk 301. Accordingly, based on the electrical signals A, B, C, D, E, and F generated by the optical detector 313, the first optical reflection signal can be the focus error signal FE51 or the summed-up sub-beam signal RFSUM51, for instance.

By contrast, in a period T52, the CD laser source constantly supplies the CD laser beam, and the object lens 311 moves downwards together with the decreasing level of the focus driving voltage. Thereby, the CD laser beam is focused on the disk 301. Accordingly, based on the electrical signals A, B, C, D, E, and F generated by the optical detector 313, the second optical reflection signal can be the focus error signal FE52 or the summed-up sub-beam signal RFSUM52, for instance.

If the control module 320 retrieves the summed-up sub-beam signal as the optical reflection signal to obtain the SAE, the first SAE (DVD) is obtained by dividing the width W51 of the summed-up sub-beam signal RFSUM51 by the peak value P51 of the summed-up sub-beam signal RFSUM51, and the second SAE (CD) is obtained by dividing the width W52 of the summed-up sub-beam signal RFSUM52 by the peak value P52 of the summed-up sub-beam signal RFSUM52. By contrast, if the control module 320 retrieves the focus error signal as the optical reflection signal to obtain the SAE, the first SAE (DVD) is obtained by dividing the width W53 of the focus error signal FE51 by the peak value P53 of the focus error signal FE51, and the second SAE (CD) is obtained by dividing the width W54 of the focus error signal FE52 by the peak value P54 of the focus error signal FE52.

Besides, the control module 320 can actually retrieve the summed-up sub-beam signal and the focus error signal to obtain the SAE. For instance, the first SAE (DVD) can be obtained by dividing the width W53 of the focus error signal FE51 by the peak value P51 of the summed-up sub-beam signal RFSUM51, and the second SAE (CD) can be obtained by dividing the width W54 of the focus error signal FE52 by the peak value P52 of the summed-up sub-beam signal RFSUM52. In another embodiment of the invention, the first SAE (DVD) can be obtained by dividing the width W51 of the summed-up sub-beam signal RFSUM51 by the peak value P53 of the focus error signal FE51, and the second SAE (CD) can be obtained by dividing the width W52 of the summed-up sub-beam signal RFSUM52 by the peak value P54 of the focus error signal FE52.

In the previous embodiments, the degree of dispersion of the optical reflection signals is exemplified by the total width of the summed-up sub-beam signals or the total width of the focus error signals, which should not be construed as a limitation to the invention. As known to people having ordinary skill in the art, parameters related to the width of signals can act as the degree of dispersion of the optical reflection signals. For instance, a partial width of an S curve (a complete waveform) of signals, i.e., ¼ or ½ width of the S curve, can be retrieved and taken as the degree of dispersion of the optical reflection signals. Similarly, in the previous embodiments, strength of the optical reflection signals is exemplified by the total peak value of the summed-up sub-beam signals or the total peak value of the focus error signals, which should not be construed as a limitation to the invention. As known to people having ordinary skill in the art, parameters related to the peak values of signals can act as the strength of the optical reflection signals. For instance, partial peak values of signals, i.e., ¼ or ½ peak values of the signals, can be retrieved and taken as the strength of the optical reflection signals.

Figure 6:
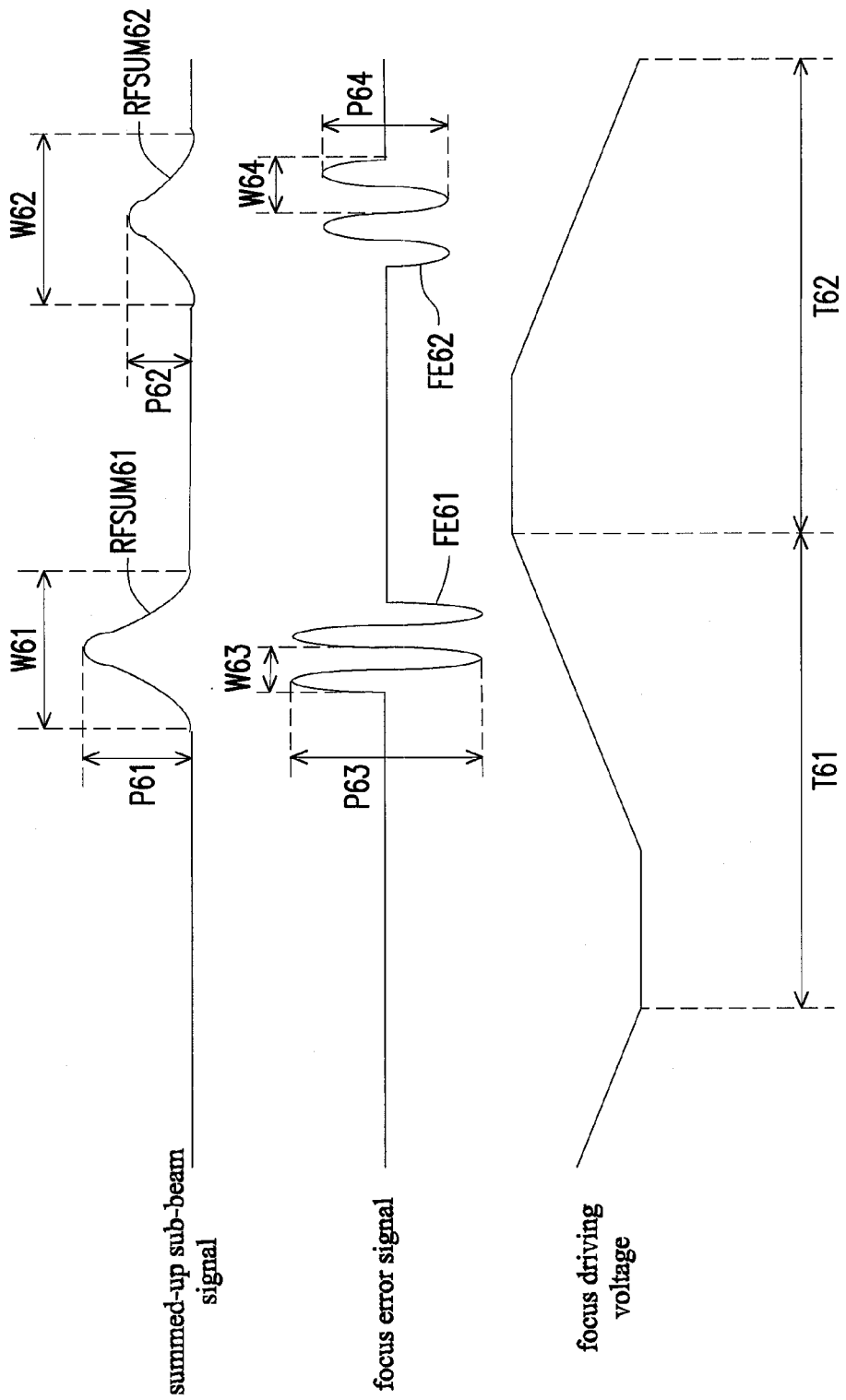
FIG. 6 is a time sequence diagram illustrating optical reflection signals and focus driving voltages generated by a system when a to-be-tested disk is a double-layer disk.

FIG. 6 is a time sequence diagram illustrating optical reflection signals and focus driving voltages generated by a system when a to-be-tested disk is a double-layer disk. With reference to FIG. 6, in a period T61, the DVD laser source constantly supplies the DVD laser beam, and the DVD laser beam is focused on the disk 301 when the object lens 311 moves upwards. Since the signal reflected by the first layer (laser 1) of the disk 301 is not apt to be detected, the optical detector 313 generates the first optical reflection signal by detecting the signal (e.g., the focus error signal FE61 or the summed-up sub-beam signal RFSUM 61) reflected by the $0^{th}$ layer (laser 0). On the other hand, in a period T62, the CD laser source constantly supplies the CD laser beam, and the CD laser beam is focused on the disk 301 when the object lens 311 moves downwards. Additionally, the optical detector 311 generates the second optical reflection signal by detecting the signal (e.g., the focus error signal FE62 or the summed-up sub-beam signal RFSUM 62) reflected by the $0^{th}$ layer.

Similarly, if the control module 320 retrieves the summed-up sub-beam signal as the optical reflection signal to obtain the SAE, the first SAE (DVD) is obtained by dividing the width W61 of the summed-up sub-beam signal RFSUM61 by the peak value P61 of the summed-up sub-beam signal RFSUM61, and the second SAE (CD) is obtained by dividing the width W62 of the summed-up sub-beam signal RFSUM62 by the peak value P62 of the summed-up sub-beam signal RFSUM62. By contrast, if the control module 320 retrieves the focus error signal as the optical reflection signal to obtain the SAE, the first SAE (DVD) is obtained by dividing the width W63 of the focus error signal FE61 by the peak value P63 of the focus error signal FE61, and the second SAE (CD) is obtained by dividing the width W64 of the focus error signal FE62 by the peak value P64 of the focus error signal FE62.

To be more specific, the optical pickup head 310 supplies two types of laser beams, and therefore the optical storage device 300 not only can read DVD, CD, but also can read a DVD-CD hybrid disk. At this time, the optical storage device 300 still needs to determine the type of the disk or the read layer of the disk. Hence, another method for determining a type of a disk applied to the optical storage device 300 is elaborated hereinafter.

Figure 7A:
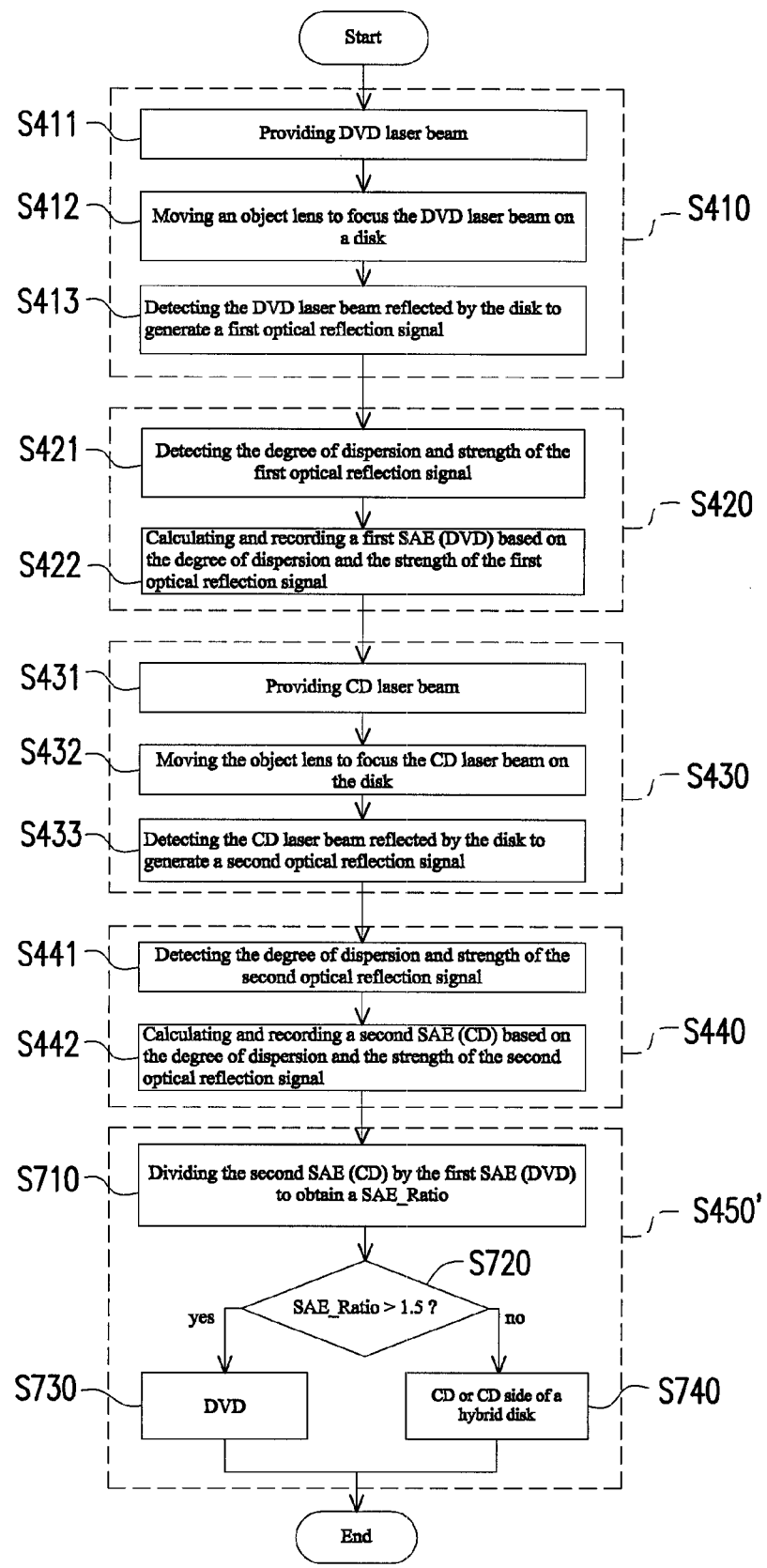
FIG. 7A is a schematic block flowchart illustrating a method for determining a type of a disk according to another embodiment of the invention.

FIG. 7A is a schematic block flowchart illustrating a method for determining a type of a disk according to another embodiment of the invention. For consistency, the same reference numbers in the flowcharts of FIG. 7A and FIG. 4 represent the same or similar steps. In FIG. 7A, to obtain the SAE when the DVD laser source is applied (step S410), the optical storage device 300 focuses the DVD laser beam on the disk 301 to generate a first optical reflection signal. Next, in step S420, the optical storage device 300 generates a first SAE (DVD) based on the degree of dispersion and strength of the first optical reflection signal.

On the other hand, to obtain the SAE when the CD laser source is applied (step S430), the optical storage device 300 focuses the CD laser beam on the disk 301 to generate a second optical reflection signal. Next, in step S440, the optical storage device 300 generates a second SAE (CD) based on the degree of dispersion and strength of the second optical reflection signal. Detailed processes in step S410~step S440 are similar to those described in the embodiment of FIG. 4, and therefore no further description is given herein.

Figure 7B:
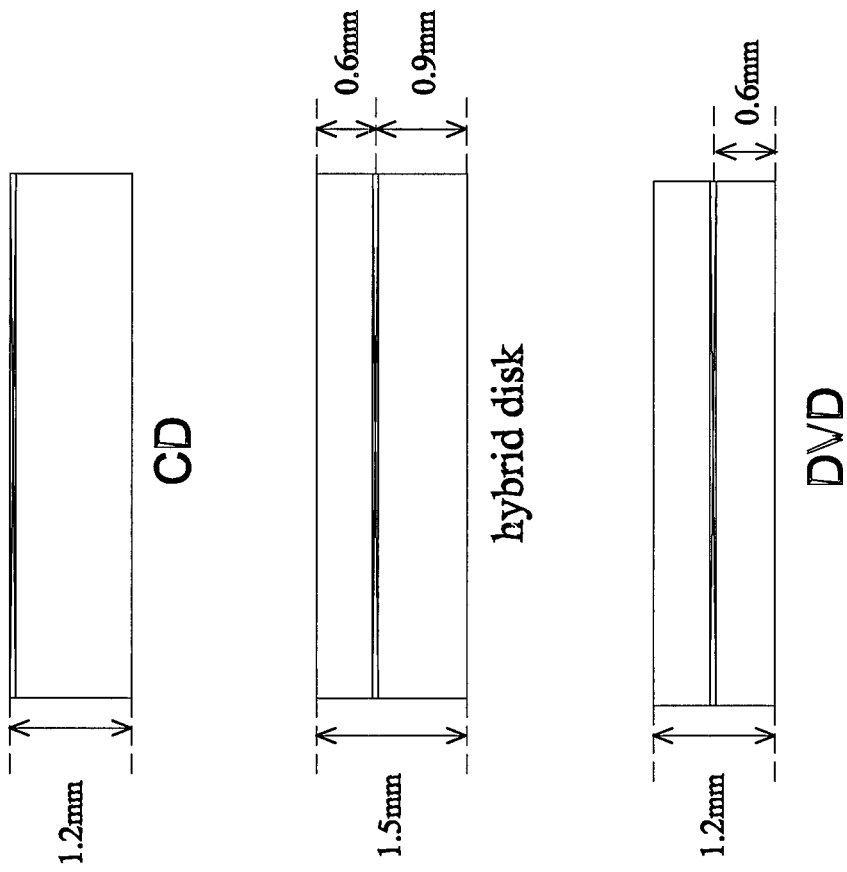
FIG. 7B is a cross-sectional structural view of a CD, a hybrid disk, and a DVD.

In step S450', the control module 320 determines the type of the disk 301 based on the first SAE (DVD) and the second SAE (CD). In step S710, the control module 320 divides the second SAE (CD) by the first SAE (DVD) to obtain a spherical aberration ratio (hereinafter referred to as "SAE_Ratio"). Thereby, the control module 320 can determine the type of the disk 301 based on the SAE_Ratio. This is mainly because the total thickness of the hybrid disk as shown in FIG. 7B (FIG. 7B is a cross-sectional structural view of a CD, a hybrid disk, and a DVD) is 1.5 mm. Both sides of the hybrid disk are readable. Besides, one side of the hybrid disk has the same configuration as the configuration of the normal DVD and has the substrate with the thickness of 0.6 mm. The other side of the hybrid disk has the same configuration as the configuration of the normal CD and has the substrate with the thickness of 0.9 mm, which is slightly thinner than the substrate of the normal CD.

Note that the thickness (0.9 mm) of the CD side of the hybrid disk falls within the range from 1.2 mm to 0.6 mm, and therefore spherical aberration occurs no matter the CD laser beam or the DVD laser beam is applied. As such, it is not easy to determine whether or not the disk 301 is the CD side of the hybrid disk based on the SAE. Hence, in this embodiment, the second SAE (CD) is divided by the first SAE (DVD), so as to determine the disk 301 based on the SAE_Ratio.

Here, if the to-be-tested disk 301 is the DVD, the SAE_Ratio is greater than 2; if the to-be-tested disk 301 is the CD, the SAE_Ratio is smaller than 0.4. Besides, if the to-be-tested disk 301 is the CD side of the hybrid disk, due to the spherical aberration, the width and a peak-to-peak value of the optical reflection signal measured when the DVD laser source or the CD laser source is applied do not differ to a great extent, and therefore the SAE_Ratio approaches 1. In other words, the to-be-tested disk 301 can be determined based on a proper threshold value (e.g., 1.5 known from experiments).

As indicated in step S720~step S730, the control module 320 determines whether the SAE_Ratio is greater than the threshold value (e.g., 1.5). If the SAE_Ratio is greater than the threshold value (e.g., 1.5), the control module 320 determines the to-be-tested disk 301 is the DVD. By contrast, if the SAE_Ratio is smaller than the threshold value (e.g., 1.5), the control module 320 determines the to-be-tested disk 301 is the CD or the CD side of the hybrid disk.

In the previous embodiments, the SAE_Ratio is obtained by dividing the second SAE (CD) by the first SAE (DVD) or by dividing the first SAE (DVD) by the second SAE (CD). People having ordinary skill in the art are aware that the SAE_Ratio is subject to change, and therefore the previous embodiments should not be construed as limitations to the invention.

Figure 8:
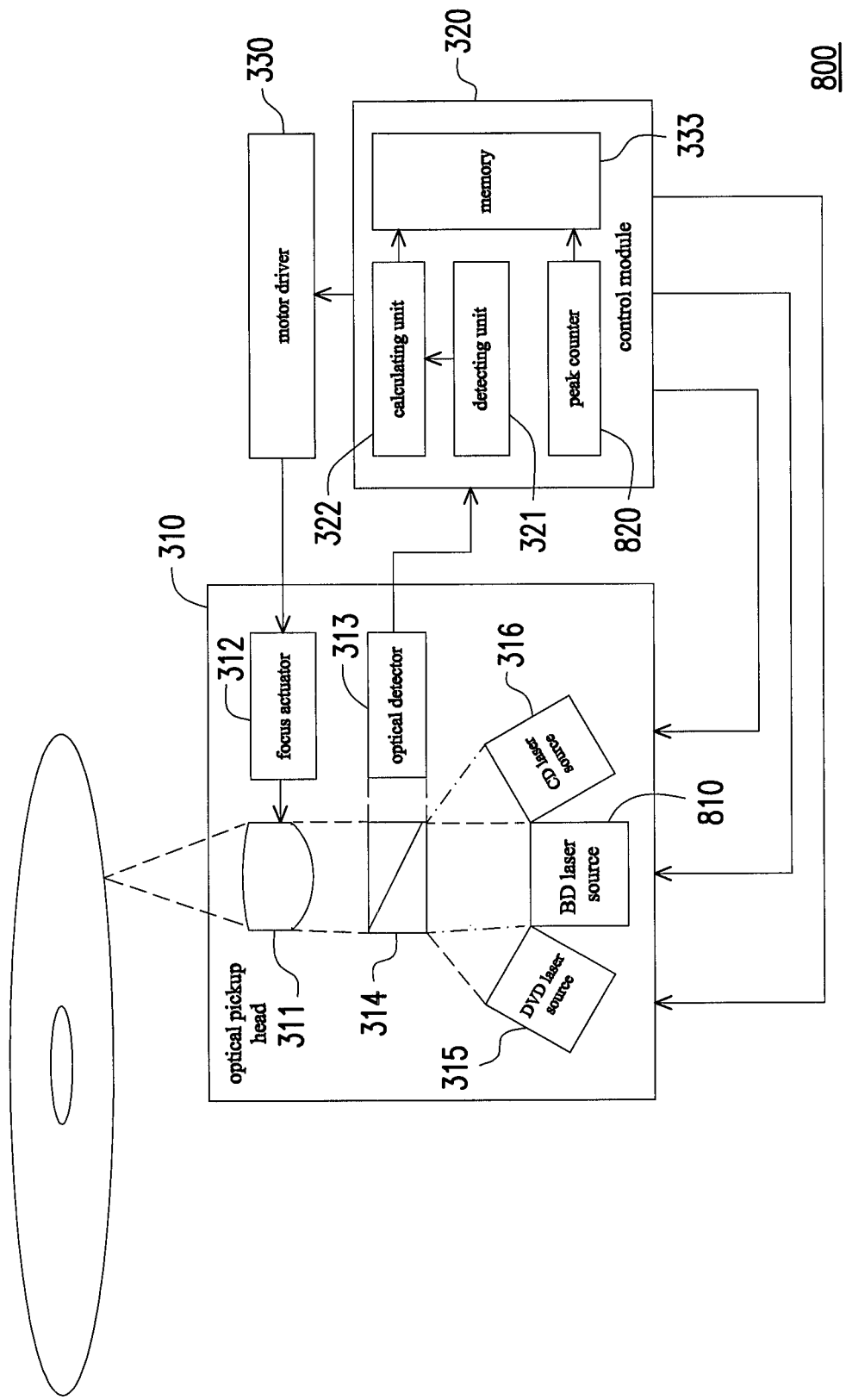
FIG. 8 is a schematic block diagram illustrating an optical storage device according to another embodiment of the invention.

FIG. 8 is a schematic block diagram illustrating an optical storage device according to another embodiment of the invention. For consistency, the same reference numbers in the optical storage device of FIG. 8 and FIG. 3 represent functionally or structurally equivalent or similar components. As indicated in FIG. 8, an optical storage device 800 includes an optical pickup head 310, a control module 320, and a motor driver 330. In comparison with the embodiment depicted in FIG. 3, the embodiment of FIG. 8 provides that the optical pickup head 310 further includes a Blu-ray disk (BD) laser source 810, and that the control module 320 further includes a peak counter 820.

Figure 9:
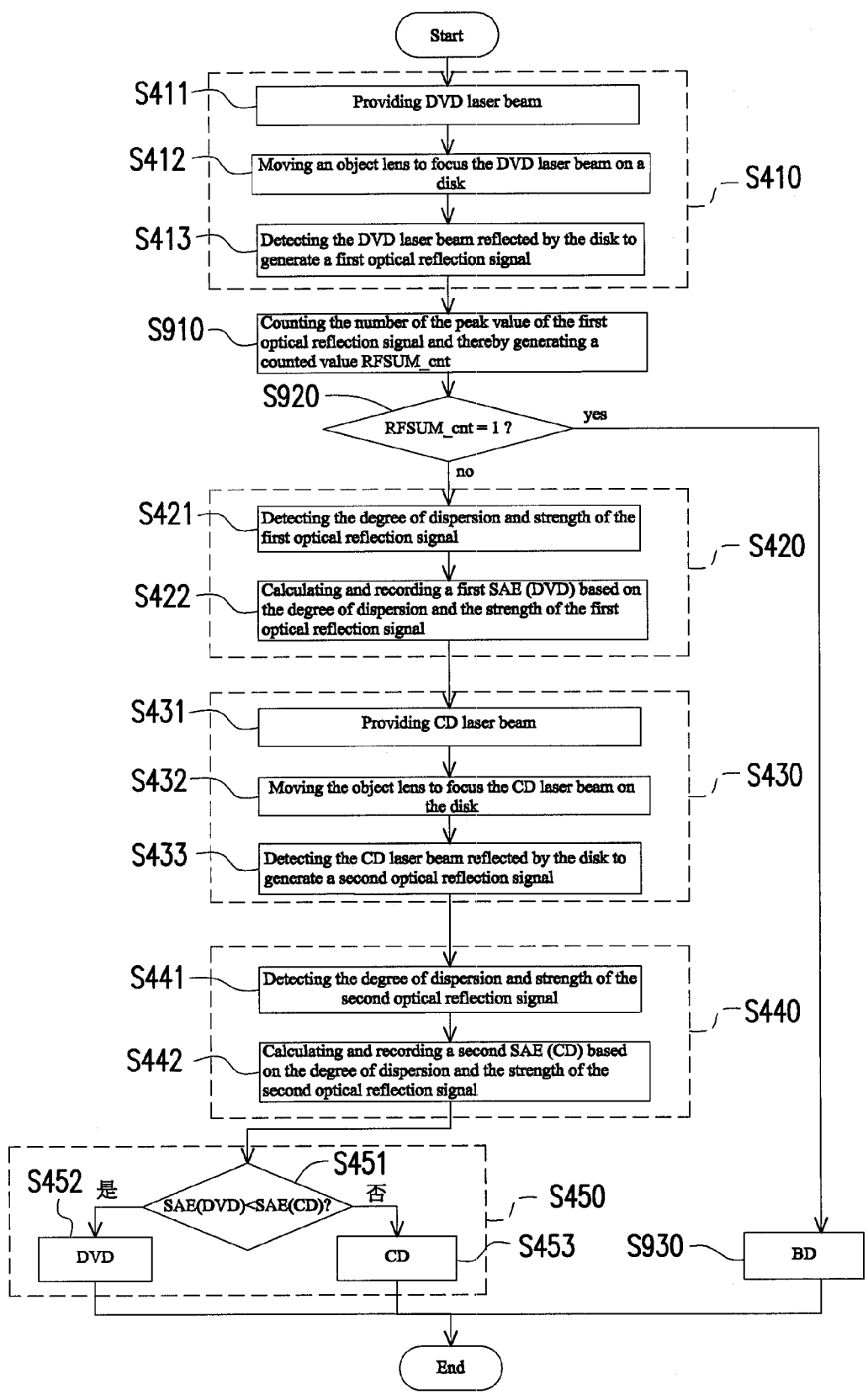
FIG. 9 is a schematic block flowchart illustrating a method for determining a type of a disk according to still another embodiment of the invention.

Since the optical pickup head 310 supplies three types of laser beams, the optical storage device 800 can read the disk 301 of the first type (the DVD), the second type (the CD), or a third type (the BD). Before reading the disk 301, the optical storage device 800 determines the type of the disk 301, so as to supply an appropriate light source. FIG. 9 is a schematic block flowchart illustrating a method for determining a type of a disk according to still another embodiment of the invention. For consistency, the same reference numbers in the flowcharts of FIG. 9 and FIG. 4 represent the same or similar steps. The operation of the optical storage device 800 is described hereinafter with reference to FIG. 8 and FIG. 9.

In step S410 and step S420, the optical storage device 300 generates the first optical reflection signal by applying the DVD laser beam and generates the first SAE (DVD) based on the degree of dispersion and the strength of the first optical reflection signal. In step S430 and step S440, the optical storage device 300 generates the second optical reflection signal by applying the CD laser beam and generates the second SAE (CD) based on the degree of dispersion and the strength of the second optical reflection signal. In step S450, the control module 320 determines the type of the disk 301 to be the DVD or the CD based on the first SAE (DVD) and the second SAE (CD). In the optical storage device 800, the components other than the BD laser source 810 and the peak counter 820 are similar to those in the embodiment depicted in FIG. 3, and the detailed processes in step S410~step S450 are similar to those depicted in FIG. 4. Thus, no further description is given herein.

On the other hand, to determine whether the to-be-tested disk 301 is the BD, as shown in step S910, the peak counter 820, after the first optical reflection signal is generated, generates a counted value RFSUM_cnt by counting the number of the peak value of the first optical reflection signal, and the peak counter 820 stores the counted value RFSUM_cnt into the memory 333. Thereby, the control module 320, based on the counted value RFSUM_cnt, can determine whether the to-be-tested disk 301 is the BD or not.

If the control module 320 retrieves the summed-up sub-beam signal RFSUM as the optical reflection signal to obtain the counted value RFSUM_cnt, the to-be-tested disk 301 is determined to be the BD when the counted value RFSUM_cnt equals 1. By contrast, the to-be-tested disk 301 is determined not to be the BD when the counted value RFSUM_cnt does not equal 1. As indicated in step S920~step S930, the control module 320 determines whether or not the counted value RFSUM_cnt equals 1. In addition, when the counted value RFSUM_cnt equals 1, the control module 320 determines the disk 301 is the BD. When the counted value RFSUM_cnt does not equal 1, the control module 320 continuously proceeds to step S420~step S450 to further determine whether the disk 301 is the DVD or the CD.

FIG. 10 is a schematic block diagram illustrating a peak counter according to an embodiment of the invention. FIG. 11A and FIG. 11B illustrate time sequence signals of the peak counter. With reference to FIG. 10, the peak counter 820 includes a comparator 1010 and a counter 1020. It is assumed the control module 320 retrieves the summed-up sub-beam signal RFSUM as the optical reflection signal, and therefore a first input end and a second input end of the comparator 1010 respectively receive the summed-up sub-beam signal RFSUM and a reference signal REF10. The counter 1020 is electrically connected to the output end of the comparator 1010.

When the to-be-tested disk 301 is the BD, the peak counter 820 receives the summed-up sub-beam signal RFSUM10 as shown in FIG. 11A. Here, as indicated in FIG. 11A, the comparator 1010 compares the summed-up sub-beam signal RFSUM10 with the reference signal REF10 and generates a comparison signal CMP10 having a single pulse. Thereby, the counted value RFSUM_cnt that is generated by counting the comparison signal CMP10 equals 1. On the contrary, when the to-be-tested disk 301 is not the BD, the peak counter 820 receives the summed-up sub-beam signal RFSUM10 as shown in FIG. 11B. Here, as indicated in FIG. 11B, the comparator 1010 compares the summed-up sub-beam signal RFSUM10 with the reference signal REF10 and generates a comparison signal CMP10 not having a single pulse. Thereby, the counted value RFSUM_cnt that is generated by counting the comparison signal CMP10 does not equal 1.

In light of the foregoing, the disk is read by applying different laser sources, and the SAEs are detected when different laser sources are applied in this invention. As a result, the type of the disk can be determined based on the SAEs in the invention. That is to say, it is not necessary to determine the type of the disk by measuring signals at the surface of the disk, and thus errors caused by measuring the signals at the surface of the disk do not occur in this invention. Moreover, in the process of generating the SAEs, the gain of the motor driver or the gain of the actuator remains consistent, so as to rectify inconsistency of the motor driver or the actuator. As such, the accuracy of disk determination can be improved in the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for determining a type of an optical disk, the method comprising:
   focusing a laser beam of a first type on the disk to generate a first optical reflection signal;
   generating a first spherical aberration estimate based on a degree of dispersion and strength of the first optical reflection signal, wherein the degree of dispersion of the first optical reflection signal is divided by the strength of the first optical reflection signal to obtain the first spherical aberration estimate;
   focusing a laser beam of a second type on the disk to generate a second optical reflection signal;
   generating a second spherical aberration estimate based on a degree of dispersion and strength of the second optical reflection signal, wherein the degree of dispersion of the second optical reflection signal is divided by the strength of the second optical reflection signal to obtain the second spherical aberration estimate; and
   determining the type of the disk based on the first spherical aberration estimate and the second spherical aberration estimate.

2. The method as claimed in claim 1, wherein the step of focusing the laser beam of the first type on the disk to generate the first optical reflection signal comprises:
   providing the laser beam of the first type, such that the laser beam of the first type passes through an object lens;
   moving the object lens to focus the laser beam of the first type on the disk; and
   detecting the laser beam of the first type reflected by the disk to generate the first optical reflection signal.

3. The method as claimed in claim 2, wherein the step of focusing the laser beam of the second type on the disk to generate the second optical reflection signal comprises:
   providing the laser beam of the second type, such that the laser beam of the second type passes through the object lens;
   moving the object lens to focus the laser beam of the second type on the disk; and
   detecting the laser beam of the second type reflected by the disk to generate the second optical reflection signal.

4. The method as claimed in claim 1, wherein the step of generating the first spherical aberration estimate based on the degree of dispersion and the strength of the first optical reflection signal comprises:
   detecting the degree of dispersion and the strength of the first optical reflection signal; and
   calculating and recording the first spherical aberration estimate based on the degree of dispersion and the strength of the first optical reflection signal.

5. The method as claimed in claim 1, wherein the step of generating the second spherical aberration estimate based on the degree of dispersion and the strength of the second optical reflection signal comprises:
   detecting the degree of dispersion and the strength of the second optical reflection signal; and
   calculating and recording the second spherical aberration estimate based on the degree of dispersion and the strength of the second optical reflection signal.

6. The method as claimed in claim 1, wherein the degree of dispersion of the first optical reflection signal and the degree of dispersion of the second optical reflection signal are respectively proportional to a width of the first optical reflection signal and a width of the second optical reflection signal, and the strength of the first optical reflection signal and the strength of the second optical reflection signal are respectively proportional to a peak value of the first optical reflection signal and a peak value of the second optical reflection signal.

7. The method as claimed in claim 1, wherein the step of determining the type of the disk based on the first spherical aberration estimate and the second spherical aberration estimate comprises:
   determining whether the first spherical aberration estimate is less than the second spherical aberration estimate;
   determining the type of the disk to be the first type when the first spherical aberration estimate is less than the second spherical aberration estimate; and determining the type of the disk to be the second type when the first spherical aberration estimate is greater than the second spherical aberration estimate.

8. The method as claimed in claim 1, wherein the step of determining the type of the disk based on the first spherical aberration estimate and the second spherical aberration estimate comprises:
dividing the second spherical aberration estimate by the first spherical aberration estimate to obtain a spherical aberration ratio;
determining whether the spherical aberration ratio is greater than a threshold value;
determining the type of the disk or a read layer of the disk to be the first type when the spherical aberration ratio is greater than the threshold value; and
determining the type of the disk or the read layer of the disk to be the second type when the spherical aberration ratio is smaller than the threshold value.

9. The method as claimed in claim 1 further comprising:
counting the number of the peak value of the first optical reflection signal and accordingly generating a counted value;
determining whether the counted value equals 1; and
determining the type of the disk to be a third type when the counted value equals 1.

10. An optical storage device comprising:
an optical pickup head respectively focusing a laser beam of a first type and a laser beam of a second type on a disk to generate a first optical reflection signal and a second optical reflection signal; and
a control module generating a first spherical aberration estimate based on a degree of dispersion and strength of the first optical reflection signal and generating a second spherical aberration estimate based on a degree of dispersion and strength of the second optical reflection signal, the control module determining a type of the disk based on the first spherical aberration estimate and the second spherical aberration estimate, wherein the control module divides the degree of dispersion of the first optical reflection signal by the strength of the first optical reflection signal to obtain the first spherical aberration estimate, and the control module divides the degree of dispersion of the second optical reflection signal by the strength of the second optical reflection signal to obtain the second spherical aberration estimate.

11. The optical storage device as claimed in claim 10, wherein the control module comprises:
a detecting unit respectively detecting the degree of dispersion and the strength of the first and second optical reflection signals;
a calculating unit calculating the first spherical aberration estimate based on the degree of dispersion and the strength of the first optical reflection signal and calculating the second spherical aberration estimate based on the degree of dispersion and the strength of the second optical reflection signal; and
a memory recording the first and second spherical aberration estimates, wherein the control module controls a motor driver based on the first and second spherical aberration estimates, such that the motor driver adjusts a level of a focus driving voltage.

12. The optical storage device as claimed in claim 11, wherein the optical pickup head comprises:
an object lens focusing the laser beam of the first type or the laser beam of the second type on the disk;
a focus actuator moving the object lens based on the focus driving voltage, such that the object lens vertically moves in an upward manner or a downward manner; and
an optical detector detecting the laser beam of the first type or the laser beam of the second type reflected by the disk to generate the first optical reflection signal or the second optical reflection signal.

13. The optical storage device as claimed in claim 12, wherein the optical pickup head further comprises:
a polarizer guiding the laser beam of the first type or the laser beam of the second type to the object lens and guiding the laser beam of the first type or the laser beam of the second type reflected by the disk to the optical detector;
a first laser source controlled by the control module to determine whether to provide the laser beam of the first type;
a second laser source controlled by the control module to determine whether to provide the laser beam of the second type; and
a third laser source controlled by the control module to determine whether to provide the laser beam of a third type.

14. The optical storage device as claimed in claim 10, wherein the degree of dispersion of the first optical reflection signal and the degree of dispersion of the second optical reflection signal are respectively proportional to a width of the first optical reflection signal and a width of the second optical reflection signal, and the strength of the first optical reflection signal and the strength of the second optical reflection signal are respectively proportional to a peak value of the first optical reflection signal and a peak value of the second optical reflection signal.

15. The optical storage device as claimed in claim 10, wherein the control module determines whether the first spherical aberration estimate is less than the second spherical aberration estimate, determines the type of the disk to be the first type when the first spherical aberration estimate is less than the second spherical aberration estimate, and determines the type of the disk to be the second type when the first spherical aberration estimate is greater than the second spherical aberration estimate.

16. The optical storage device as claimed in claim 10, wherein the control module divides the second spherical aberration estimate by the first spherical aberration estimate to obtain a spherical aberration ratio and determines whether the spherical aberration ratio is greater than a threshold value, so as to determine the type of the disk to be the first type when the spherical aberration ratio is greater than the threshold value and determine the type of the disk or a read layer of the disk to be the second type when the spherical aberration ratio is smaller than the threshold value.

17. The optical storage device as claimed in claim 10, wherein the control module further comprises:
a peak counter counting the number of the peak value of the first optical reflection signal to generate a counted value, wherein the control module determines whether the counted value equals 1, so as to determine the type of the disk to be a third type when the counted value equals 1.

18. The optical storage device as claimed in claim 17, wherein the peak counter comprises:
a comparator having a first input end, a second input end, and an output end, the first input end receiving the first optical reflection signal, the second input end receiving a reference signal, the output end generating a comparison signal; and a counter electrically connected to the output end of the comparator, the counter counting the comparison signal and generating the counted value based on the comparison signal.

* * * * *